United States Patent [19]
von der Eltz et al.

[11] Patent Number: 5,354,850
[45] Date of Patent: Oct. 11, 1994

[54] WATER-SOLUBLE PHENYLAZO NAPHTHYLAZONAPHTHYL COMPOUNDS CONTAINING A DICHLORO-S-TRIAZINYL AMINO GROUP, SUITABLE AS DYES

[75] Inventors: Andreas von der Eltz, Frankfurt am Main; Werner H. Russ, Flörsheim, both of Fed. Rep. of Germany

[73] Assignee: Hoechst AG, Frankfurt, Fed. Rep. of Germany

[21] Appl. No.: 82,607

[22] Filed: Jun. 24, 1993

[30] Foreign Application Priority Data

Jun. 25, 1992 [DE] Fed. Rep. of Germany ....... 4220834

[51] Int. Cl.$^5$ .................... C09B 62/09; D06P 1/382
[52] U.S. Cl. .................. 534/637; 534/581; 534/582; 534/887
[58] Field of Search ......................... 534/637

[56] References Cited

U.S. PATENT DOCUMENTS

| | | | |
|---|---|---|---|
| 4,089,895 | 5/1978 | Jager | 534/637 X |
| 4,798,887 | 1/1989 | Krueger et al. | 534/637 |
| 5,079,347 | 1/1992 | Büch | 534/637 |

FOREIGN PATENT DOCUMENTS

| | | | |
|---|---|---|---|
| 0042108 | 12/1981 | European Pat. Off. | 534/637 |
| 0319845 | 6/1989 | European Pat. Off. | |
| 1102204 | 2/1968 | United Kingdom | 534/637 |

*Primary Examiner*—Patricia L. Morris
*Assistant Examiner*—Fiona T. Powers
*Attorney, Agent, or Firm*—Connolly and Hutz

[57] ABSTRACT

Water-soluble disazo compounds, a process for their preparation and their use as dyes.

Disazo compounds are described which have the formula (1) given and defined below and are used in their function as fiber-reactive dyes for the dyeing of hydroxy- and/or carboxamido-containing fiber material, such as cellulose fiber materials and synthetic and natural polyamide fiber materials, such as wool. They produce brown dyeings and prints having high color strength and good color fastness by the application and fixation methods customary for fiber-reactive dyes

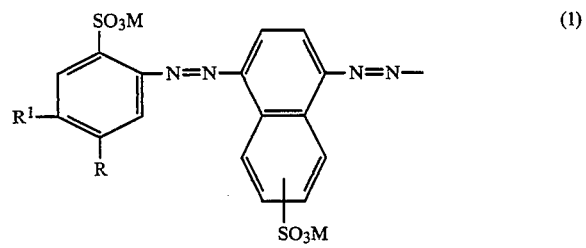

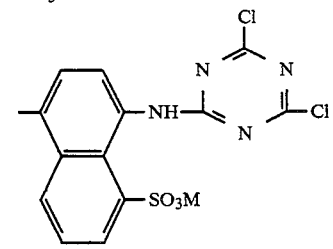

in which
R is hydrogen or sulfo,
$R^1$ is hydroxy, methoxy or ethoxy,
is hydrogen or an alkali metal and the non-fixed sulfo group in the naphthylene radical is in the 6 or 7 position.

4 Claims, No Drawings

WATER-SOLUBLE PHENYLAZO NAPHTHYLAZONAPHTHYL COMPOUNDS CONTAINING A DICHLORO-S-TRIAZINYL- AMINO GROUP, SUITABLE AS DYES

The invention is in the technical field of fiber-reactive azo dyes.

The European patent application with the publication No. 0,042,108A, U.S. Pat. Nos. 4,798,887 and 5,079,347 and British Patent No. 1,102,204 disclose phenylazo-naphthylazonaphthylamino compounds whose amino group has attached to it a fiber-reactive chlorotriazinyl radical. These known disazo compounds provide dyeings having a brown hue; however, their dye properties are still in need of improvement, for example with respect to their color strength and, as far as the dyes of U.S. Pat. No. 5,079,347 are concerned, with respect to the light-fastness and hypochlorite bleaching fastness properties of the dyeings.

This object is achieved according to the present invention by the below-defined disazo compounds of the formula (1)

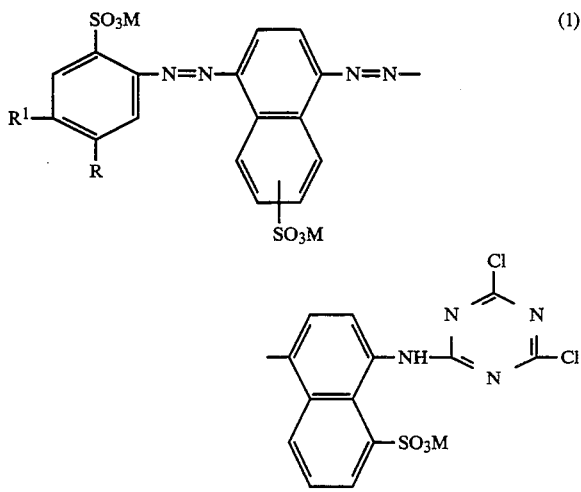

where

R is hydrogen or sulfo;

$R^1$ is hydroxy, methoxy or ethoxy, preferably methoxy;

M is hydrogen or an alkali metal, such as sodium, potassium or lithium;

the non-fixed sulfo group in the naphthylene radical is in the 6 or 7 position.

Preference is given to disazo compounds of the formula (1) in which $R^1$ is methoxy, and furthermore to those in which R is hydrogen.

Above and below, a sulfo group is a group of the formula —$SO_3M$ where M has the abovementioned meaning.

The disazo compounds according to the invention can be present in the form of their free acid and, preferably, in the form of their salts, in particular their neutral salts, such as the alkali metal salts. The disazo compounds of the formula (1) are used preferably in the form of these salts for the dyeing and printing of hydroxy-and/or carboxamido-containing fiber material.

The present invention further provides a process for the preparation of the disazo compounds according to the invention, which comprises reacting an aminodisazo compound of the formula (2)

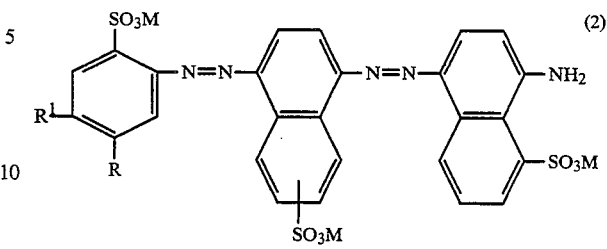

in which R, $R^1$ and M have the abovementioned meaning and which can be prepared in a manner customary and known per se by diazotization and coupling of the corresponding components, with cyanuric chloride (2,4,6-trichloro-1,3,5-triazine).

The reaction according to the invention of the compound of the formula (2) with cyanuric chloride can be carried out in an aqueous-organic medium (the organic solvent portion being, for example, acetone, dimethylformamide, dioxane or dimethyl sulfoxide); preferably, it takes place in aqueous solution or suspension. As a rule, the reaction temperature is between −10° C. and +30° C., preferably between +5° C. and +25° C. As a rule, a pH of between 4 and 7, preferably of between 4 and 6.5, is maintained.

As already mentioned, the starting compounds of the formula (2) are obtained in the usual manner by diazotization and coupling. Examples of diazo components which, after being diazotized, are coupled onto a 6- or 7-sulfo-1-aminonaphthalene compound are 2-sulfo-4-methoxyaniline, 2-sulfo-4-ethoxyaniline and 2,5-disulfo-4-methoxyaniline.

Precipitation and isolation of the disazo compound of the formula (1) prepared according to the invention from the synthesis solutions can take place by generally known methods, for example either by precipitation of the reaction medium by means of electrolytes, such as, for example, sodium chloride or potassium chloride, or by evaporation of the reaction solution, for example spray-drying, in which case a buffer substance can be added to the synthesis solution.

The disazo compounds according to the invention of the formula (1)—hereinafter designated as compounds (1)—have fiber-reactive dye properties. Accordingly, they can be used for the dyeing (including printing) of hydroxy-containing and/or carboxamido-containing fiber material. Likewise, the solutions formed during synthesis of the compounds (1) can, if appropriate after addition of a buffer substance and, if appropriate, after concentrating, be used directly as a liquid preparation for dyeing.

Accordingly, the present invention also relates to the use of the compounds (1) according to the invention for the dyeing (including printing) of hydroxy- and/or carboxamido-containing fiber materials and to methods for applying them to these substrates. The materials are preferably used in the form of textile fibers, such as yarns, wound packages and fabrics. This can be done following known procedures.

Hydroxy-containing materials are those of natural or synthetic origin, such as, for example, cellulose fiber materials or regenerated products thereof and polyvinyl alcohols. Cellulose fiber materials are preferably cotton but also other vegetable fibers, such as linen, hemp, jute and ramie fibers; examples of regenerated cellulose fibers are staple viscose and filament viscose.

Examples of carboxamido-containing materials are synthetic and natural polyamides and polyurethanes in the form of fibers, for example wool and other animal hair, silk, leather, nylon-6,6, nylon-6, nylon-11 and nylon-4.

In accordance with the application according to the invention, compounds (1) can be applied to the substrates mentioned and fixed thereon by the application methods known for water-soluble dyes, in particular fiber-reactive dyes, for example by applying compound (1) to the substrate in dissolved form or incorporating it therein and fixing it on or in the material by application of heat or by exposure to an alkaline agent or by both measures. Such dyeing and fixation procedures have been described in large numbers not only in the technical literature but also in the patent literature, such as, for example, in European Published Patent Applications Nos. 0,078,009A and 0,181,585A.

Compounds (1) are distinguished by a high color strength; accordingly, they produce brown, in particular reddish brown, dyeings and prints having good color buildup in combination with very low temperature and alkali dependence in high color yields not only on carboxamido-containing materials, such as, in particular, on wool, but also on hydroxy-containing material, such as, in particular, cellulose fiber material. The dyes are moreover suitable for trichromatic dyeing. The dyeings and prints have good fastness properties, such as good light and wet fastness properties, for example the dyed material wetted with drinking water or an acidic or alkaline perspiration solution having high hypochlorite bleach fastness and high wet light fastness properties, furthermore good pleating fastness, hot press fastness and rubbing fastness, good wash fastness properties at 60° to 95° C., even in the presence of perborates, acid and alkaline milling, cross-dyeing and perspiration fastness properties, high stability to steaming, good alkaline, acid, water and seawater fastness properties and good acid fading on storage of the moist, acid-containing, dyed material (see German Auslegeschrift 2,322,236, column 4, lines 35 to 42).

The Examples which follow serve to illustrate the invention. Parts and percentages are by weight unless stated otherwise. Parts by weight relate to parts by volume as the kilogram relates to the liter. The compounds described in the Examples by way of their formulae are written in the form of the free acid; in general, they are prepared in the form of their alkali metal salts and are used for dyeing in the form of their salts.

The absorption maxima ($\lambda_{max}$ values) given for the visible region were determined using the aqueous solution of the alkali metal salts.

Example 1

213 parts of 4-methoxyaminobenzene-3-sulfonic acid are diazotized in 1000 parts of an aqueous sulfuric acid solution; 223 parts of 1-aminonaphthalene-6-sulfonic acid are added, and the coupling reaction is carried out at a pH of between 4 and 5 and a temperature between 10° and 15° C. The aminoazo compound obtained is then diazotized in the usual manner, excess nitrous acid is destroyed by sulfamic acid, and 223 parts of 1-aminonaphthalene-8-sulfonic acid are added to the batch, and the second coupling reaction is carried out in accordance with the above conditions. The disazo compound obtained is isolated by salting out with sodium chloride and then introduced into a finely divided suspension of 194 parts of cyanuric chloride in 500 parts of ice water. The reaction takes place at a pH of 6 and at a temperature of between 5° and 20° C. After reaction is complete (no detection of free amino groups), 20 parts of kieselguhr are added in order to clarify the synthesis solution obtained, and the solution is then filtered.

The disazo compound according to the invention can be isolated, if appropriate with the addition of a buffer substance, by salting out with sodium chloride, filtration and drying or by spray-drying. A powder of the alkaline metal salt (sodium salt) according to the invention of the compound of the formula

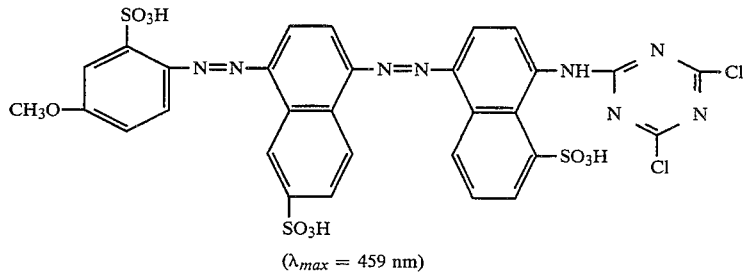

($\lambda_{max}$ = 459 nm)

containing electrolyte salt (predominantly containing sodium chloride) is obtained.

This disazo compound has very good dyeing properties and produces reddish brown dyeings and prints of high color strength, good fastness properties, in particular high lightfastness and high hypochlorite bleach fastness, on the materials mentioned in the description, in particular cellulose fiber materials, such as cotton, by the application and fixation methods customary in the art for dyeing, in particular for fiber-reactive dyes, and substantially independently of the temperature and the amount of alkali selected.

Example 2

To prepare a disazo compound according to the invention, the procedure of Example 1 is repeated, except that an equimolar amount of 4-methoxyaminobenzene-2,5-disulfonic acid is used instead of 4-methoxyamninobenzene-3-sulfonic acid as the diazo component. The resulting disazo compound according to the invention of the formula (written in the form of the free acid)

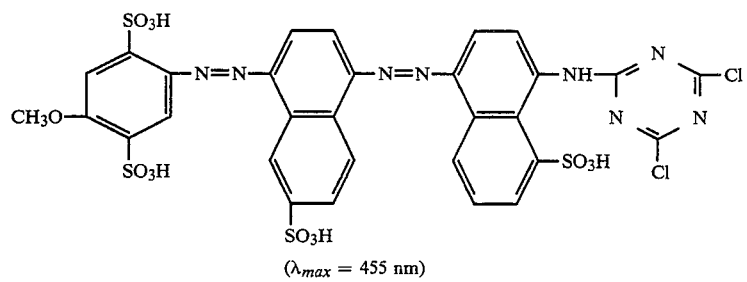

($\lambda_{max}$ = 455 nm)

is isolated as the sodium salt by salting out with sodium chloride or by spray-drying. The disazo compound according to the invention has similar dye properties to that from Example 1.

What is claimed is:

1. A disazo compound of the formula (1)

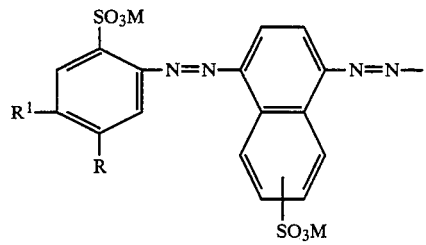
(1)

-continued in which
R is hydrogen or sulfo;
$R^1$ is hydroxy, methoxy or ethoxy;
M is hydrogen or an alkali metal; the non-fixed sulfo group in the naphthylene radical is in the 6 or 7 position.

2. A disazo compound as claimed in claim 1, wherein $R^1$ is methoxy.

3. A disazo compound as claimed in claim 1 wherein R is hydrogen.

4. A disazo compound as claimed in claim 2, wherein R is hydrogen.

* * * * *